US012098307B2

(12) United States Patent
Fernandes et al.

(10) Patent No.: US 12,098,307 B2
(45) Date of Patent: Sep. 24, 2024

(54) ADHESIVE COMPOSITION FOR FLEXIBLE LAMINATION

(71) Applicant: Henkel AG & Co. KGaA, Duesseldorf (DE)

(72) Inventors: Guilherme Rodrigues Fernandes, Itapevi - Sao Paulo (BR); Carlos Eduardo Pontel, Jundiaí - São Paulo (BR)

(73) Assignee: Henkel AG & Co. KGaA, Duesseldorf (DE)

( * ) Notice: Subject to any disclaimer, the term of this patent is extended or adjusted under 35 U.S.C. 154(b) by 591 days.

(21) Appl. No.: 17/326,919

(22) Filed: May 21, 2021

(65) Prior Publication Data

US 2021/0277297 A1 Sep. 9, 2021

Related U.S. Application Data

(63) Continuation of application No. PCT/EP2019/081436, filed on Nov. 15, 2019.

(30) Foreign Application Priority Data

Nov. 30, 2018 (EP) .................................... 18209384

(51) Int. Cl.
| | | |
|---|---|---|
| C09J 175/06 | (2006.01) | |
| B32B 7/12 | (2006.01) | |
| C08G 18/36 | (2006.01) | |
| C08G 18/42 | (2006.01) | |
| C08G 18/58 | (2006.01) | |
| C08G 18/72 | (2006.01) | |
| C08G 18/76 | (2006.01) | |
| C09D 175/04 | (2006.01) | |
| C09J 11/04 | (2006.01) | |
| C09J 11/06 | (2006.01) | |
| C09J 175/04 | (2006.01) | |
| B32B 27/32 | (2006.01) | |
| B32B 27/36 | (2006.01) | |
| B32B 27/40 | (2006.01) | |

(52) U.S. Cl.
CPC .............. *C09J 175/06* (2013.01); *B32B 7/12* (2013.01); *C08G 18/4288* (2013.01); *C08G 18/58* (2013.01); *C08G 18/76* (2013.01); *C09D 175/04* (2013.01); *C09J 11/04* (2013.01); *C09J 11/06* (2013.01); *C09J 175/04* (2013.01); *B32B 27/32* (2013.01); *B32B 27/36* (2013.01); *B32B 27/40* (2013.01); *B32B 2307/546* (2013.01); *B32B 2439/70* (2013.01); *C08G 18/36* (2013.01); *C09J 2423/046* (2013.01); *C09J 2467/006* (2013.01); *C09J 2491/00* (2013.01)

(58) Field of Classification Search
CPC .... C08G 18/4288; C08G 18/36; C08G 18/58; C09J 175/04; C09J 175/06
See application file for complete search history.

(56) References Cited

U.S. PATENT DOCUMENTS

| | | | |
|---|---|---|---|
| 4,508,853 A | 4/1985 | Kluth et al. | |
| 4,551,517 A * | 11/1985 | Herold | ................... C09J 175/08 427/386 |
| 4,886,893 A * | 12/1989 | Meffert | ................ C07D 303/42 549/513 |
| 6,057,375 A | 5/2000 | Wollenweber et al. | |
| 6,433,121 B1 | 8/2002 | Petrovic et al. | |
| 8,471,072 B2 | 6/2013 | Suppes et al. | |
| 9,758,614 B2 | 9/2017 | Jimenez et al. | |
| 2006/0041157 A1 | 2/2006 | Petrovic et al. | |
| 2010/0190951 A1 | 7/2010 | Suppes et al. | |
| 2011/0294946 A1 | 12/2011 | Craun et al. | |
| 2013/0078473 A1* | 3/2013 | Kollbach | ............... C09J 175/04 524/718 |

FOREIGN PATENT DOCUMENTS

| | | | | |
|---|---|---|---|---|
| DE | 3246612 A1 * | 6/1984 | ........... | C07D 303/42 |
| EP | 0113798 A1 | 7/1984 | | |
| JP | S59118779 A | 7/1984 | | |
| JP | H11510729 A | 9/1999 | | |
| KR | 20090066018 A | 6/2009 | | |
| RU | 2016116787 A | 11/2017 | | |
| WO | 2006012344 A1 | 2/2006 | | |
| WO | 2010100121 A1 | 9/2010 | | |
| WO | 2011109720 A1 | 9/2011 | | |

OTHER PUBLICATIONS

Official Journal of the European Union / Commission Regulation (EU) No. 10/2011 of Jan. 14, 2011 on plastic materials and articles intended to come into contact with food.
ASTM International / ASTM D4878—15 Standard Test Methods for Polyurethane Raw Materials: Determination of Viscosity of Polyols.
ASTM International / Astm D4662—15 Standard Test Methods for Polyurethane Raw Materials: Determination of Acid and Alkalinity Numbers of Polyols.
ASTM International / Astm F904—16 Standard Test Method for Comparison of Bond Strength or Ply Adhesion of Similar Laminates Made from Flexible Materials.
ASTM International / Astm D4274—16 Standard Test Methods for Testing Polyurethane Raw Materials: Determination of Hydroxyl Numbers of Polyols.

(Continued)

*Primary Examiner* — David J Buttner
*Assistant Examiner* — Surbhi M Du
(74) *Attorney, Agent, or Firm* — Sun Hee Lehmann

(57) ABSTRACT

The present invention refers to an adhesive composition for flexible lamination, especially for food packaging, which comprises a vegetable oil-based polyol and an NCO-terminated compound as well as a method of producing the vegetable oil-based polyol. Further, the present invention refers to the use of the inventive adhesive composition in flexible lamination and an article comprising the inventive adhesive composition.

19 Claims, No Drawings

(56) References Cited

OTHER PUBLICATIONS

International Search Report for International PCT Patent Application No. PCT/EP2019/081436 dated Feb. 28, 2020.

* cited by examiner

ADHESIVE COMPOSITION FOR FLEXIBLE LAMINATION

The present invention refers to an adhesive composition for flexible lamination, especially for food packaging, which comprises a vegetable oil-based polyol and an NCO-terminated compound as well as a method of producing the vegetable oil-based polyol. Further, the present invention refers to the use of the inventive adhesive composition in flexible lamination and an article comprising the inventive adhesive composition.

In light of the growing awareness of the scarcity of resources, there have been ongoing efforts to replace conventional petro-based materials with materials obtained from renewable sources that have a lower impact on environment. However, apart from identifying suitable materials which are available on an industrial scale, replacement of the conventionally used materials leads to different product properties and performances which in most cases are inferior. Although suitable materials have been identified in a number of technical fields, there are still applications where the replacement of petro-based materials remains a challenge, especially in applications where additional safety and regulatory measures have to be taken into account, e.g. in cases where the products might come into contact with food or pharmaceuticals, such as in the food packaging industry. Polyurethane adhesives have been used in the production of food packaging and are known to be compatible with all necessary safety requirements as set out, for example, in the European food contact legislations summarized in EU No. 10/2011 and the US food contact regulations as summarized in 21 CFR 175.105 and 21 CFR 182.1073. It is therefore desirable to provide polyurethanes which are based on renewable materials and which meet the requirements of cited safety regulations. One approach to meet said aim is the employment of polyols obtained from renewable sources such as vegetable oil as a starting material for the production of the desired polyurethanes.

Polyols produced from unsaturated vegetable oils, so called bio-polyols or bio-based polyols, are extensively used in polyurethane formulations, especially for the production of rigid and flexible foams. The use of this type of bio-based polyols in the manufacturing of polyurethane adhesives for flexible laminations is still very limited mainly due to the polymer properties such as high viscosity, high functionality and low stability.

Polyurethane adhesives used for flexible laminations in the production of food packaging can be classified as solvent-free adhesives and solvent-borne adhesives. In the case of solvent-free adhesives, a very demanding challenge is the achievement of the right balance between low viscosity, suitable reactivity and compatibility of the employed polyols with other raw materials used. In case of solvent-borne adhesives, low free isocyanate value and higher molecular weight are the main challenges which are encountered in the adhesive production on an industrial scale.

U.S. Pat. No. 6,433,121 discloses a method for making natural oil-based polyols directly from vegetable or animal oil using a consecutive two-step process involving epoxidation and hydroxylation. The disclosed process involves adding a peroxyacid to natural oil wherein said peroxyacid and said natural oil react to form an epoxidized natural oil and adding said epoxidized natural oil directly without intermediate purification to a mixture of an alcohol, water and a catalytic amount of fluoboric acid wherein the water content is about 10% to 30% by weight of all components and wherein said epoxidized natural oil reacts with said mixture to form a natural oil-based polyol. The described method further comprises a washing and neutralization step in order to avoid any negative influence of the employed catalyst on the final polyol.

US 2010/0190951 provides a process for preparing soy-based oligomeric polyols or substituted oligomeric polyols as well as urethane bioelastomers comprising the oligomeric polyols or substituted oligomeric polyols.

US 2006/0041157 refers to a method of making unsaturated modified vegetable oil-based polyols, the method comprising reacting a mixture comprising an epoxidized vegetable oil and a ring opener to form an oligomeric modified vegetable oil-based polyol, wherein the modified vegetable oil-based polyol comprises at last about 20% oligomers and has a viscosity at 25° C. of less than about 8 Pas.

WO 2011/109720 relates to two component laminating polyurethanes adhesives used in flexible packaging industry which show a reduced amount of volatile or migratable substances. The two-component solvent-free polyurethane adhesive comprises a first component comprising a first vegetable oil-based polyol A in an amount from 20 to 40 wt.-%, a second vegetable oil-based polyol B in an amount of 0.5 to 5 wt.-% and a polyisocyanate C in an amount of 60 to 74 wt.-%; and a second component comprising a first vegetable oil-based polyol A in an amount of 87 to 99 wt.-% and a polyol E in an amount of 0.5 to 5 wt.-%. Although the use of vegetable oil-based polyols is described, it is not specified how those vegetable-oil based polyols are obtained.

WO 2006/012344 refers to a method of making an oligomeric modified vegetable oil-based polyol comprising reacting a mixture comprising an epoxidized vegetable oil and a ring opener to form an oligomeric modified vegetable oil-based polyol, wherein the oligomeric modified vegetable oil-based polyol comprises at least about 20% oligomers and has a viscosity at 25° C. of less than 8 Pas. According to the described process, the epoxidized vegetable oil is blended with petrochemical-based polyols and fluoroboric acid is employed.

The cited prior art references show that although a number of processes are known in the state of the art for the production of bio-based polyols, all of them have in common that they use materials, such as fluoroboric acid or aromatic sulfonic acid, which are not listed in the respective regulations cited above. However, the use of any unlisted components such as monomers or additives leads to bio-based polyols that may have good overall mechanical and optical properties, but which are unsuited for the production of food packaging. In addition, even though the polyols themselves are plant-based products, other materials used in the production process come from petrol-based sources, reducing the content of renewable materials in the final product.

As a result, there still exists the need for adhesive compositions based on upper percentages of renewable materials which are suitable to be used in the production of food packaging avoiding the use of any materials and compounds not listed in the regulations such as in EU No. 10/2011 and the US food contact regulations as summarized in 21 CFR 175.105 and 21 CFR 182.1073. It is therefore an object of the present invention to provide such an adhesive composition which is in compliance with official safety requirements set out in regard to food packaging.

It was surprisingly found that the above-mentioned object is solved by an adhesive composition comprising a specific vegetable oil-based polyol and an NCO-terminated compound.

A first subject of the present invention is therefore an adhesive composition for flexible lamination comprising
a) a vegetable oil-based polyol;
b) an NCO-terminated compound;
characterized in that the vegetable oil-based polyol is obtained from a reaction (A) comprising
i) unsaturated epoxidized vegetable oil;
ii) an alcohol;
iii) an organic acid; and
iv) an inorganic acid.

As used herein, unsaturated epoxidized vegetable oil refers to a non-naturally occurring vegetable oil prepared by treating a naturally occurring oil so as to modify the chemical structure of the molecule to epoxidize some but not all of the double bonds present in the vegetable oil.

It was surprisingly found than an adhesive composition as described above does not only show excellent adhesive properties with regard to average bond strength and maximum sealing strength, but also complies with the official food contact regulations set out in EU No. 10/2011 and the US food contact regulations as summarized in 21 CFR 175.105 and 21 CFR 182.1073. Further, it was surprisingly found that the inventive adhesive composition can be employed in both, solvent-free and solvent-borne systems.

The inventive adhesive composition is especially designed to replace commonly used compositions which contain mostly petro-based components. In a preferred embodiment of the present invention, the vegetable oil-based polyol is therefore derived from renewable sources and/or the content of renewable materials in the reaction mixture (A) is more than 90 wt.-%, preferably more than 95 wt.-%, especially more than 98 wt.-%, based on the total weight of the solvent-free reaction mixture (A). Compounds derived from "renewable sources" within the context of the present invention refers to compounds which do not stem from petro-based sources but are obtained from renewable sources which are replenished through natural reproduction such as wood. A vegetable oil-based polyol derived from renewable sources thus refers to a polyol which is produced exclusively from renewable sources without the presence of any petroleum-derived components.

Although the content and ratios of the components present in reaction mixture (A) may be adjusted according to need, the best results with regard to product performance of the later adhesive composition were observed in cases where the contents of the components of reaction mixture (A) where kept within certain limits. In a preferred embodiment, the content of the unsaturated epoxidized vegetable oil in reaction mixture (A) is 25 to 95 wt.-%, preferably 30 to 95 wt.-%, based on the total weight of the solvent-free reaction mixture (A). The unsaturated epoxidized vegetable oil is preferably derived from a natural oil, in particular a vegetable oil selected from the group consisting of soybean oil, corn oil, sunflower oil, linseed oil, olive oil, canola oil, sesame oil, cottonseed oil, palm oil, rapeseed oil, Tung oil, or a blend of any of these oils. The unsaturated epoxidized vegetable oil preferably has an epoxy oxygen content (EOC) of 0.05 to 10 wt.-%, preferably 0.1 to 9 wt.-%, based on the molecular weight of the respective vegetable oil. The epoxy oxygen content of a given molecule, also referred to as % oxirane oxygen, specifies the weight percentage of oxirane oxygen in a molecule.

The unsaturated epoxidized vegetable oil may be obtained by reacting vegetable oil together with a peroxyacid to form a partially epoxidized vegetable oil under conditions that converts less than 100% of the double bonds of the vegetable oil to epoxide groups.

Further preferred is an embodiment of the invention wherein the content of the alcohol in reaction mixture (A) is 2 to 20 wt.-%, preferably 5 to 15 wt.-%, based on the total weight of the solvent-free reaction mixture (A). The alcohol employed in reaction mixture (A) is preferably a naturally occurring alcohol obtained from renewable sources. In an especially preferred embodiment, the alcohol is selected from the group consisting of ethanol, second generation ethanol, alcohols and glycols originated from biomass, alcohols and glycols originated from cellulose and its derivates, alcohols and glycols originated from sugar and its derivates as well as mixtures and blends thereof.

The common processes for making vegetable oil-based polyols usually employ catalysts, such as fluoroboric acid. However, such catalysts are not listed in the regulations as uncritical when it comes to the safety regulations for food packaging. It has therefore to be ensured that no traces of the catalyst are present in the final polyol. The removal of the catalyst is often a tedious process which includes several washing and neutralization steps which lead to an increase in the production time and costs. It was surprisingly found that the commonly used catalysts can be avoided in the production of the vegetable oil-based polyol employed in the inventive adhesive composition. In a preferred embodiment of the invention, the reaction mixture A is therefore essentially free of any compounds not listed in the official food safety regulations such as EU No. 10/2011 and, the US food contact regulations as summarized in 21 CFR 175.105 and 21 CFR 182.1073. Further, in a preferred embodiment, the reaction mixture A is essentially free of fluoroboric acid. "Essentially free" within the meaning of the present invention means a content of less than 5 wt.-%, preferably less than 1 wt.-%, in particular less than 0.5 wt.-% and most preferably less than 0.1 wt.-%. In an alternatively preferred embodiment, the reaction mixture A complies with the food safety regulations as set out EU No. 10/2011 and the US food contact regulations as summarized in 21 CFR 175.105 and 21 CFR 182.1073. Without being bound by theory it is believed that in particular the mixture of an organic and inorganic acid, as employed in the present invention, makes the necessity of compounds such as fluoroboric acid superfluous.

The reaction mixture (A) from which the vegetable-oil based polyol employed in the inventive adhesive composition is derived from further comprises an organic acid. The content of the organic acid in the reaction mixture (A) is preferably 0.5 to 7 wt.-%, more preferably 1 to 5 wt.-%, based on the total weight of the solvent-free reaction mixture (A). The organic acid is preferably a naturally occurring organic acid obtained from renewable sources. Preferably the organic acid is selected from the group consisting of acetic acid, lactic acid, succinic acid, caproic acid and fatty acids as well as mixtures thereof.

In addition to the unsaturated epoxidized vegetable oil, the alcohol and the organic acid, reaction mixture (A) also comprises an inorganic acid. The content of the inorganic acid in the reaction mixture (A) is preferably 0.5 to 7 wt.-%, more preferably 1 to 5 wt.-%, based on the total weight of the solvent-free reaction mixture (A). The inorganic acid is preferably a naturally occurring inorganic acid obtained from mineral sources. Preferably the inorganic acid is a mineral acid, in particular one selected from the group consisting of nitric acid, phosphoric acid, polyphosphoric acids, sulfuric acid, poly phosphorous acid, hydrochloric acid, perchloric acid and mixtures thereof.

In an especially preferred embodiment, reaction mixture (A) comprises the following:
i) 25 to 95 wt.-%, preferably 30 to 95 wt.-% of an unsaturated epoxidized vegetable oil;
ii) 2 to 20 wt.-%, preferably 5 to 15 wt.-% of an alcohol;
iii) 0.5 to 7 wt.-%, preferably 1 to 5 wt.-% of an organic acid; and
iv) 0.5 to 7 wt.-%, preferably 1 to 5 wt.-% of an inorganic acid, the wt.-% being based on the total weight of the solvent-free reaction mixture (A), respectively.

The adhesive composition according to the invention may be employed in solvent-free as well as solvent-borne systems. It was surprisingly found that a good balance of the required properties could be achieved if the vegetable oil-based polyol employed in the inventive adhesive composition which is obtained from reaction mixture (A) has an average number molecular weight $M_n$ of no more than 5000 g/mol. In a preferred embodiment the vegetable oil-based polyol therefore has an average number molecular weight $M_n$ of 500 to 5000 g/mol, preferably 800 to 3000 g/mol, determined by GPC. The molecular weight may be measured using a Waters HPLC equipment with a refractive index detector. Polystyrene standards may be used establish calibration curves while THE serves as a suitable diluent.

In a further preferred embodiment, the vegetable oil-based polyol preferably has a hydroxyl value (OH-value) of 1 to 250 mg KOH/g, preferably 5 to 250 mg KOH/g, determined according to ASTM D-4274. The hydroxyl value is defined as the number of milligrams of potassium hydroxide required to neutralize the acetic acid taken up on acetylation of one gram of a chemical substance that contains free hydroxyl groups. The hydroxyl value is a measure of the content of free hydroxyl groups in a chemical substance, usually expressed in units of the mass of potassium hydroxide (KOH) in milligrams equivalent to the hydroxyl content of one gram of the chemical substance.

As mentioned above, one of the challenges faced in providing suitable bio-based polyols is the high viscosity. It was surprisingly found that those problems were not observed in the present invention. Rather, it was found that the vegetable oil-based polyol present in the adhesive composition possessed a viscosity well suitable for the desired applications. In a preferred embodiment, the vegetable oil-based polyol therefore has a viscosity of 0.1 to 500 Pas, preferably 0.1 to 400 Pas, determined according to ASTM D-4878 at 25° C., using a Brookfield RTV.

The adhesive composition according to the invention further comprises an NCO-terminated compound. Although there are no special requirements with regard to the NCO-terminated compound, the NCO-terminated compound is preferably a diisocyanate. In a preferred embodiment, the NCO-terminated compound is selected from the groups consisting of 1,5-Naphthylendiisocyanate (NDI), 2,4'- or 4,4'-Diphenylmethandiisocyanate (MDI), isomers of Toluylendiisocyanates (TDI), Methylentriphenyltriisocyanate (MIT), hydrated MDI (H12MDI), Tetramethylxylylendiisocyanate (TMXDI), 1-Isocyanatomethyl-3-isocyanato-1,5,5-trimethylcyclohexane (IPDI), Xylylendiisocyanate (XDI), Hexan-1,6-diisocyanate (HDI), Pentamethylendiisocyanate, Dicyclohexylmethandiisocyanate as well as dimers, trimers, oligomers and polymers of the same.

Suitable (poly)isocyanate prepolymers are reactions products of compounds comprising OH groups and/or NH groups with an excess of polyisocyanates. Suitable prepolymers can for example be obtained by reacting a diol with an excess of isocyanate.

In an especially preferred embodiment, the NCO-terminated compound is also derived from renewable sources. It is therefore preferred that the NCO-terminated compound is selected from 2,4'- or 4,4'-Diphenylmethandiisocyanate (MDI) as well as mixtures thereof.

A further subject of the present invention is a method for the production of a vegetable oil-based polyol as used in the adhesive composition according to the invention. The inventive method comprises the following steps:
a) providing a reaction mixture comprising unsaturated epoxidized vegetable oil, an alcohol, an organic acid and an inorganic acid; and
b) heating the reaction mixture of step a) to a temperature of 70 to 130° C., preferably 80 to 120° C.

It was surprisingly found that the inventive method yields the desired vegetable oil-based polyol under mild conditions without the need for any solvents. In a preferred embodiment, the method according to the invention is therefore carried out without any solvents, thereby improving the sustainability of the adhesive composition by reducing toxic waste.

It was further surprisingly found that the inventive method may be carried out in the absence of any of the commonly used catalysts, such as fluoroboric acid or other compounds which are not in compliance with the food safety regulations. This has the advantage that no neutralizing and/or washing steps are required in order to remove any critical compounds from the final product. In a preferred embodiment, the inventive method therefore does not include a washing and/or neutralization step.

In a preferred embodiment, the inventive method further comprises a distillation step c). Distillation is preferably carried out at a temperature of 100 to 130° ° C., preferably 105 to 125° C. The distillation by-products can be re-used in subsequent processes, thus contributing to the minimization of waste production.

In a further preferred embodiment, the organic acid and the inorganic acid are added stepwise in batches over an extended period of time until the entire amount of organic and inorganic acid has been added, respectively. The batches in which the organic and inorganic acid are added preferably make up 10 to 40 wt.-% of the entire amount of organic acid and inorganic acid to added, respectively.

The adhesive composition according to the invention is especially suitable for the production of food packaging. A further subject of the present invention is therefore the use of the inventive adhesive composition in flexible lamination, especially for the production of food packaging.

The adhesive composition is especially suitable for flexible lamination, in particular in the area of food packaging production. In this type of application, two or more films, in particular paper, plastic films and/or aluminum foils are bonded together using adhesives to make flexible packages for foodstuffs. A further subject of the present invention is therefore an article comprising the adhesive composition according to the invention. Preferably the adhesive composition is comprised in the inventive article in a cured state. In an especially preferred embodiment, the inventive article is a food packaging.

The invention will be explained in more detail with reference to the following example, which by no means are to be understood as limiting the spirit and scope of the invention.

Testing Methods:

The hydroxyl number was measured using a standard titration procedure with KOH as described in ASTM D-4274. The results are presented as mg KOH per gram of substance.

Viscosity of the polymers was measured using a Brookfield RVT with spindle number 21 and a speed of 50 rpm at a temperature of 25° C. as described in ASTM D-4878.

The acid number of the obtained substances was measured using a standard titration procedure with KOH as described in ASTM D-4662. The results are presented as mg KOH per gram of substance. The acid number can be understood as the content of free carboxylic acid groups in the substance.

Molecular weight ($M_n$) distribution of the polyols was measured in a Waters HPLC equipment using a refractive index detector. Polystyrene standards were used for calibration while THF served as the diluent.

Bond strength values of laminates were measured using 2.54 cm wide samples in a universal testing machine following ASTM method F-904-16, using a separation speed of 280 mm/min.

Maximum sealing strength values were measured in the same testing machine following ASTM R88-00 (2001).

EXAMPLES

Vegetable Oil-Based Polyol

Unsaturated vegetable oil which had previously been partially epoxidized was introduced into a reaction reactor, followed by the addition of the alcohol. The reaction mixture was heated in the reactor to a temperature in the range of 80 to 110° C. and a batch of the organic acid and the inorganic acid was added, the batch making up 10 to 40 wt.-% of the total amount of organic and inorganic acid, respectively. The reaction mixture was maintained at a temperature in the range of 80 to 110° C. for 2 hours before another batch of the organic acid and the inorganic acid was added. The reaction mixture was again kept in the prescribed temperature range before the final batch of organic and inorganic acid was added. The reaction mixture was then kept at a temperature of 80 to 110° C. for a period of 20 to 35 hours. After completion of the reaction, the desired vegetable oil-based polyol was obtained by distillation. The obtained polyol had an average molecular weight $M_n$ of 1131 g/mol and a polydispersity of 1.56, determined according to the above-mentioned methods. Hydroxyl value and acidity number were determined to be 117 mg KOH/g and 0.71 mg KOH/g, respectively. The viscosity was measured to be 0.4 Pas, determined according to ASTM D-4878 at 25° C., using a Brookfield RTV.

Inventive Example

A 1200 ml round bottomed flask equipped with a thermometer, a heating mantle, a stirrer and nitrogen gas flush inlet was charged as follows: an aromatic isocyanate was added into the reactor and followed by sequential addition of the vegetable oil-based polyol. The reactor temperature was set to 75° C. and the reaction was carried out for 2 hours. Solvent-free adhesive 02 was discharged from the reactor and isocyanate level and viscosity were measured following the above-mentioned testing methods.

Comparative Example

A 1200 ml round bottomed flask equipped with a thermometer, a heating mantle, a stirrer and nitrogen gas flush inlet was charged as follows: an aromatic isocyanate was added into the reactor, followed by sequential addition of propylene glycols (molecular weight 1000 to 2000 g/mol) and vegetable oil. The reactor temperature was set to 75° C. and the reaction was carried out for 2 hours. Solvent-free adhesive 01 was discharged from the reactor and isocyanate level and viscosity were measured following the above-mentioned testing methods.

Application Tests:

Comparative adhesive 01 was mixed with a commercially available hardener in a fixed proportion of 10 parts of adhesive 01 and 8 parts of hardener to run lamination described below.

Solvent free adhesive 02 was mixed with a commercially available hardener in a fixed proportion of 10 parts of adhesive 02 and 8 parts of hardener to run lamination described below.

The mixture was applied on different films (see table below) in a Nordmeccanica Labo Combi Lamination Machine and laminated to standard flexible packaging films.

| Test | Unit | Adhesive 01 (comp.) | Adhesive 02 |
|---|---|---|---|
| Average bond strength (flexible laminate 1) | gf/inch | 902 | 984 |
| Average bond strength (flexible laminate 2) | gf/inch | 290 | 307 |
| Average bond strength (flexible laminate 3) | gf/inch | 297 | 211 |
| Maximum Sealing strength (flexible laminate 1) | gf/inch | 6160 | 5760 |
| Maximum Sealing strength (flexible laminate 2) | gf/inch | 2495 | 2488 |
| Maximum Sealing strength (flexible laminate 3) | gf/inch | 490 | 391 |

Flexible laminate 1: PET Film (12 microns)/adhesive/Polyethylene film (60 microns), adhesive coating weight: 2.1 g/m$^2$, Flexible laminate 2: PET metalized (12 microns)/Adhesive/Polyethylene film (60 microns): adhesive coating weight: 2.1 g/m$^2$, Flexible Laminate 3: BOPP metalized (14 microns)/Adhesive/BOPP (14 microns): adhesive coating weight: 2.1 g/m$^2$.

The adhesion and sealing strength results obtained clearly show that the inventive adhesive composition comprising a polyol based on renewable sources can be used to replace adhesive compositions comprising synthetic polyols for lamination.

The invention claimed is:

1. Adhesive composition for flexible lamination comprising:
   a) a vegetable oil-based polyol and
   b) an NCO-terminated compound;
   wherein the vegetable oil-based polyol is a reaction product of a mixture (A) comprising
      i) unsaturated epoxidized vegetable oil;
      ii) an alcohol;
      iii) an organic acid selected from the group consisting of acetic acid, lactic acid, succinic acid, caproic acid, fatty acids and mixtures thereof; and
      iv) an inorganic acid and wherein the mixture (A) is essentially free of fluoroboric acid.

2. The adhesive composition according to claim 1 wherein the vegetable oil-based polyol is derived from renewable sources and/or the content of renewable materials in the reaction (A) is more than 90 wt. %, based on the total weight of the mixture (A) not including any solvent.

3. The adhesive composition according to claim 1 wherein the mixture (A) comprises:
   i) 25 to 95 wt. % of an unsaturated epoxidized vegetable oil;
   ii) 2 to 20 wt. % of an alcohol;
   iii) 0.5 to 7 wt. % of an organic acid; and
   iv) 0.5 to 7 wt. % of an inorganic acid,
   wherein the wt. % are based on the total weight of the mixture (A) not including any solvent.

4. The adhesive composition according to claim 1 wherein the mixture (A) comprises:
   i) 30 to 95 wt. % of an unsaturated epoxidized vegetable oil;
   ii) 5 to 15 wt. % of an alcohol;
   iii) 1 to 5 wt. % of an organic acid; and
   iv) 1 to 5 wt. % of an inorganic acid,
   wherein the wt. % are based on the total weight of the mixture (A) not including any solvent.

5. The adhesive composition according to claim 1 wherein the mixture (A) is compliant with the food safety regulations set out EU No. 10/2011 and the US food contact regulations summarized in 21 CFR 175.105 and 21 CFR 182.1073.

6. The adhesive composition according to claim 1 wherein the unsaturated epoxidized vegetable oil is derived from a vegetable oil selected from the group consisting of soybean oil, corn oil, sunflower oil, linseed oil, olive oil, canola oil, sesame oil, cottonseed oil, palm oil, rapeseed oil, tung oil or a blend of any of these oils.

7. The adhesive composition according to claim 1 wherein the unsaturated epoxidized vegetable oil has an epoxy oxygen content of 0.05 to 10%, based on the number of double bonds in the vegetable oil.

8. The adhesive composition according to claim 1 wherein the alcohol is selected from the group consisting of ethanol, second generation ethanol, alcohols and glycols originated from biomass, alcohols and glycols originated from cellulose and its derivates, alcohols and glycols originated from sugar and its derivates and mixtures and blends thereof.

9. The adhesive composition according to claim 1 wherein the organic acid is selected from the group consisting of acetic acid, lactic acid, succinic acid, caproic acid and mixtures thereof.

10. The adhesive composition according to claim 1 wherein the inorganic acid is a mineral acid, selected from the group consisting of nitric acid, phosphoric acid, polyphosphoric acids, sulfuric acid, poly phosphorous acid, hydrochloric acid, perchloric acid and mixtures thereof.

11. The adhesive composition according to claim 1 wherein the NCO-terminated compound is selected from the group consisting of 1,5-Naphthylendiisocyanate (NDI); 2,4'- or 4,4'-Diphenylmethandiisocyanate (MDI); isomers of Toluylendiisocyanates (TDI); Methylentriphenyltriisocyanate (MIT), hydrated MDI (H12MDI); Tetramethylxylylendiisocyanate (TMXDI); 1-Isocyanatomethyl-3-isocyanato-1,5,5-trimethylcyclohexane (IPDI); Xylylendiisocyanate (XDI); Hexan-1,6-diisocyanate (HDI); Pentamethylendiisocyanate, Dicyclohexylmethandiisocyanate; dimers, trimers, oligomers and polymers of the above; and mixtures of the above.

12. A method for the production of the a) vegetable oil-based polyol of claim 1, comprising:
   a) providing the mixture (A) comprising the i) unsaturated epoxidized vegetable oil, the ii) alcohol, the iii) organic acid; and the iv) inorganic acid;
   b) heating the reaction mixture to a temperature of 70 to 130° C.

13. The method according to claim 12, wherein the method does not include a washing step and/or a neutralization step.

14. An article comprising the adhesive composition according to claim 1.

15. A flexible laminate comprising a first film including a surface, a second film including a surface and cured reaction products of the adhesive of claim 1 disposed between the first and second films and bonding the first film surface to the second film surface.

16. A food package comprising a foodstuff contained within a pouch comprising the flexible laminate of claim 15.

17. An adhesive composition for flexible lamination comprising:
   a) a vegetable oil-based polyol and
   b) an NCO-terminated compound;
   wherein the vegetable oil-based polyol is a reaction product of a mixture (A) comprising
      i) 25 to 95 wt. % of an unsaturated epoxidized vegetable oil;
      ii) 2 to 20 wt. % of an alcohol;
      iii) 0.5 to 7 wt. % of an organic acid; and
      iv) 0.5 to 7 wt. % of an inorganic acid.

18. Cured reaction products of the adhesive composition according to claim 17.

19. A flexible laminate comprising a first film including a surface, a second film including a surface and the adhesive of claim 17 disposed between the first and second films and in contact with the first film surface and the second film surface.

* * * * *